Patented Aug. 4, 1936

2,049,470

UNITED STATES PATENT OFFICE 2,049,470

ORE CONCENTRATION

Robert L. Perkins, East Aurora, N. Y., assignor to National Aniline & Chemical Company, Inc., New York, N. Y., a corporation of New York No Drawing. Application January 9, 1930, Serial No. 419,731

15 Claims. (Cl. 209—166)

This invention relates to the separation of minerals and the concentration of ores by flotation processes, and is particularly directed to such separation and concentration carried out with the utilization as flotation or collecting agents of certain aromatic bodies which contain sulfur in their composition.

An object of the invention is to provide a process for the manufacture of condensation products of aromatic hydrocarbons containing sulfur.

Another object of the invention is to provide organic condensation products of aromatic hydrocarbons, containing sulfur.

A further object of the invention is the provision of efficient mineral collecting or modifying agents in the froth flotation of minerals and ores.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the present invention, improved results can be obtained in the separation of minerals and the concentration of ores by flotation by carrying out the flotation operation with the addition to the mineral pulp or ore of a composite (i. e., mixed) organic condensation product derived or derivable by the interaction of an aromatic hydrocarbon of the benzene series, a sulfur chloride, and anhydrous aluminum chloride, and particularly the said condensation product in which, or with which, free sulfur has been subsequently dissolved or combined, the said product being preferably one which is liquid at ordinary temperatures.

The flotation or collecting agents utilized in the present invention are the complex or composite organic condensation products which can be prepared by reacting an aromatic hydrocarbon of the benzene series, e. g. benzene, toluene, etc., with a sulfur chloride, e. g. sulfur dichloride, $SCl_2$, and particularly disulfur dichloride, in the presence of anhydrous aluminum chloride, and preferably, subsequently reacting free sulfur with the isolated organic condensation product thus obtained.

In the production of the composite organic condensation product, the reaction is preferably carried out in the presence of an excess of the hydrocarbon and at a temperature not higher than about 50° C., e. g. 0° to 50° C., a temperature of about 0° to 15° C. being preferred. For each 100 parts of hydrocarbon employed, it is advantageous to use about 10 to 20 parts each of disulfur dichloride and of anhydrous aluminum chloride, and subsequently to treat the isolated organic condensation product, which is substantially free from aluminum or aluminum compounds, and preferably after it has been subjected to a partial purification, with sulfur at an elevated temperature, the amount of sulfur employed being preferably such that no free solid sulfur is present in the final product at ordinary temperature.

As illustrative embodiments of a manner in which the invention may be carried into practice and of the products produced, the following examples are presented: the parts are by weight.

Example 1.—(a) To a mixture of 300 parts benzene and 50 parts anhydrous aluminum chloride at a temperature maintained at 0° to 10° C., there is slowly added over a period of one hour, with stirring, a solution of 50 parts disulfur dichloride previously dissolved in 50 parts benzene. The mixture is stirred for one-half hour after completion of addition of the disulfur dichloride solution and then poured onto ice and allowed to stratify. The upper layer comprising the benzene solution is filtered and the excess benzene is evaporated off. The crude, oily product thus obtained is substantially free from aluminum compounds. If desired, the crude, oily product may be purified by cooling the same to about 3° to 5° C., and filtering off any insoluble product or impurities which may have separated out. For further purification, it may be treated in any suitable manner, for example, by distillation under reduced pressure. The crude or purified composite product, particularly the product which has been partially purified by cooling, has been found to be a valuable collecting or modifying agent in the concentration of minerals, said product, however, being improved as a collecting flotation agent if it is subsequently treated with sulfur as follows:

(b) One part of the crude, oily product, from which the insoluble impurities have been removed by cooling and filtration, is gently heated at boiling temperature under a reflux condenser with one-quarter to one-half part of sulfur until, upon cooling the reaction mixture to ordinary temperature, e. g., 15° to 25° C., no sulfur crystallizes out. Usually, about one-half to one hour is required to bring about the reaction. The resulting product is a dark oily liquid which has a boiling point above 300° C. It is insoluble in water and gives a purplish color when warmed with concentrated sulfuric acid. This product is regarded as new and as forming a part of the present invention. It has been found to be an excellent modifying agent in the separation of ores by froth flotation.

The following example will illustrate the use of the collecting agents contemplated by the present invention in ore concentration: the parts are by weight.

*Example 2.*—500 parts of a copper sulfide ore (Nevada Consolidated Copper Company, Hurley, N. M.) assaying 1.26 per cent. copper was ground in a ball mill to a pulp with 215 parts water and 0.5 part hydrated lime. 0.098 part of the oily product prepared as described in Example 1 (b), was then incorporated with the ground pulp, the mixture diluted with water to give a mixture containing about 15 to 16 per cent. solids, and subjected to froth flotation in a Janney apparatus. A small amount of pine oil was, added, e. g., 0.02 to 0.04 part, and the flotation operation carried on for about 15 minutes. 81.4 parts of a rougher concentrate assaying 6.93 per cent. copper was obtained which is a recovery of 89.3 per cent. copper.

In a duplicate test on the same ore except in place of 0.098 part of the condensation product described in Example 1 (b), there was used 0.0745 part of the reagent which had been prepared as described in Example 1 (a), there was obtained 60 parts of a rougher concentrate assaying 8.48 per cent. copper which is a recovery of 80.6 per cent. copper.

It will thus be noted that the present invention contemplates the utilization as flotation or collecting agents in the separation of minerals and the concentration of ores, of a composite organic condensation product derived from an aromatic hydrocarbon of the benzene series, particularly benzene, by interaction with a sulfur chloride and anhydrous aluminum chloride, and more particularly said composite organic condensation product with which sulfur has been subsequently combined; that said collecting agents may be incorporated in or with the ore or mineral at any suitable time and in any suitable manner; and that they may be used in conjunction with other collecting agents, or with frothing agents, or with both.

It will be understood that the present invention is applicable to the treatment of various kinds of mineral products, both natural and artificial, which are amenable to concentration by froth flotation processes.

It will be also understood that the invention is not limited to the use of the particular agents or other ingredients mentioned in the examples, and that other agents, particularly other collecting agents of the class or type mentioned, can be employed.

It is further to be understood that the following claims are intended to cover all of the generic and specific features of the invention herein described, and all statements of the scope of the invention which, as a matter of language, might be said to fall therebetween.

I claim:

1. In the concentration of ores, the process which comprises subjecting an ore pulp to a froth flotation operation in the presence of a composition produced by combining sulfur with a mixed organic condensation product derivable from an aromatic hydrocarbon of the benzene series, a sulfur chloride, and anhydrous aluminum chloride.

2. In the concentration of ores, the process which comprises subjecting an ore pulp to a froth flotation operation in the presence of a composition comprising the mixed organic condensation product derivable from an aromatic hydrocarbon of the benzene series, disulfur dichloride and anhydrous aluminum chloride at a temperature not higher than 50° C.

3. In the concentration of ores, the process which comprises subjecting an ore pulp to a froth flotation operation in the presence of a composition comprising the mixed organic condensation product derivable from benzene, disulfur dichloride and anhydrous aluminum chloride at a temperature of 0° to 15° C.

4. In the concentration of ores, the process which comprises subjecting an ore pulp to a froth flotation operation in the presence of a composition produced by combining sulfur with a mixed organic condensation product derivable from benzene, disulfur dichloride and anhydrous aluminum chloride.

5. As a new product, the composition derived by reacting sulfur with a mixed organic condensation product obtained from an aromatic hydrocarbon of the benzene series, a sulfur chloride and anhydrous aluminum chloride.

6. As a new product, the composition derived by reacting sulfur with a mixed organic condensation product obtained from an aromatic hydrocarbon of the benzene series, disulfur dichloride and anhydrous aluminum chloride; said composition being insoluble in water, and being a collecting agent in the froth separation of minerals.

7. As a new product, the composition derived by reacting sulfur with a mixed organic condensation product obtained from benzene, disulfur dichloride and anhydrous aluminum chloride; said composition being an oil insoluble in water, and being a collecting agent in the froth separation of minerals.

8. As a new product, the composition derived by reacting sulfur with a mixed organic condensation product obtained by treating an aromatic hydrocarbon of the benzene series with a sulfur chloride in the presence of anhydrous aluminum chloride at a temperature of 0° to 50° C., said composition being an oil insoluble in water and being a collecting agent in the froth flotation of minerals.

9. As a new product, the composition derived by reacting sulfur with the mixed organic condensation product obtained by reacting benzene with disulfur dichloride in the presence of anhydrous aluminum chloride at a temperature of 0° to 10° C., said composition being an oil insoluble in water, and being a collecting agent in the froth flotation of minerals.

10. As a new product, the composition derived by reacting 350 parts of benzene with 50 parts of disulfur dichloride and 50 parts of anhydrous aluminum chloride at a temperature of about 10° C. separating the reaction product, and heating one part of the separated reaction product under refluxing conditions with at least one-quarter part of sulfur.

11. A process for the preparation of organic condensation products containing sulfur, which comprises reacting an aromatic compound of the benzene series with a sulfur chloride and anhydrous aluminum chloride and treating the mixed organic condensation product formed with sulfur.

12. A process for the preparation of organic condensation products containing sulfur, which comprises reacting benzene with disulfur dichloride and anhydrous aluminum chloride and treating the mixed organic condensation product formed with sulfur.

13. A process for the preparation of organic condensation products containing sulfur, which comprises reacting 350 parts of benzene with 50 parts of disulfur dichloride and 50 parts of anhydrous aluminum chloride at a temperature of about 10° C., separating the reaction product, and heating it under refluxing conditions with at least one-quarter part of sulfur.

14. In the concentration of ores, the process which comprises subjecting an ore pulp to a froth flotation operation in the presence of a mixed organic condensation product which is liquid at ordinary temperatures, said mixed organic condensation product being derivable by interacting an aromatic hydrocarbon of the benzene series, a sulfur chloride and anhydrous aluminum chloride, cooling the product, filtering off impurities, and treating the mass with sulfur.

15. In the concentration of ores, the process which comprises subjecting a pulp of a copper sulfide ore to a froth flotation operation in the presence of the oily condensation product derived by reacting sulfur with the mixed organic condensation product obtained by reacting benzene with disulfur dichloride in the presence of anhydrous aluminum chloride at a temperature of 0° to 10° C.

ROBERT L. PERKINS.